United States Patent

Noma

Patent Number: 5,247,017
Date of Patent: Sep. 21, 1993

[54] AROMATIC POLYAMIDE RESIN COMPOSITION FOR COMPRESSION MOLDING

[75] Inventor: Takashi Noma, Iwakuni, Japan

[73] Assignee: Teijin Limited, Osaka, Japan

[21] Appl. No.: 888,990

[22] Filed: May 26, 1992

Related U.S. Application Data

[62] Division of Ser. No. 543,212, Jun. 25, 1990, Pat. No. 5,177,158.

[30] Foreign Application Priority Data

Jul. 4, 1989 [JP] Japan .................................. 1-171193

[51] Int. Cl.$^5$ ............................................. C08L 77/00
[52] U.S. Cl. ...................................... 525/133; 525/153
[58] Field of Search ......................... 525/133, 153, 179

[56] References Cited

FOREIGN PATENT DOCUMENTS 0176242 10/1983 Japan .................................. 525/133
0184254 10/1984 Japan .................................. 525/420
2004748 1/1987 Japan .................................. 525/420

Primary Examiner—Ana L. Carrillo
Attorney, Agent, or Firm—Burgess, Ryan & Wayne

[57] ABSTRACT

An aromatic polyamide resin composition useful for producing compression-molded resin articles having an excellent impact strength, comprising 3 to 40% by weight of PEEK resin fibers, the balance consisting of an aromatic polyamide resin particles, and optionally, 10% by weight or less of PTFE resin particles, which effectively enhance the abrasion resistance of the compression-molded resin article.

3 Claims, No Drawings

AROMATIC POLYAMIDE RESIN COMPOSITION FOR COMPRESSION MOLDING

This is a division of application Ser. No. 543,212, filed Jun. 25, 1990 now U.S. Pat. No. 5,177,158.

BACKGROUND OF THE INVENTION

1) Field of the Invention

The present invention relates to an aromatic polyamide resin composition for compression molding. More particularly, the present invention relates to an aromatic polyamide resin composition useful for producing compression molded articles having an high impact strength and a superior abrasion resistance.

2) Description of the Related Art

It is known that shaped articles having a high thermal resistance can be produced by compression-molding aromatic polyamide resin particles. For example, Japanese Unexamined Patent Publication (Kokai) No. 62-121731 discloses aromatic polyamide resin particles having an average particle size of from 10 to 400 μm and an average particle surface area of from 1 to 20 m$^2$/g, and useful for compression-molding.

The shaped aromatic polyamide resin articles have a high acid-resistance, flame-retardance, machinability, and self-lubricity. Nevertheless, the shaped aromatic polyamide resin articles exhibit an unsatisfactory mechanical property, for example, impact strength, and thus are not suitable for uses in which a high impact strength is required.

To enhance the impact strength, attempts have been made to blend reinforcing fibers with the aromatic polyamide resin. Usually, the reinforcing fibers were selected from carbon fiber particles and short cut aramide fibers. Nevertheless, it was found that the conventional reinforcing fibers do not satisfactorily enhance the impact strength of the compression-molded aromatic polyamide resin articles. Also, to ensure the enhancement of the impact strength, a large amount of the conventional reinforcing fibers must be blended with the aromatic polyamide resin, and this blending of a large amount of reinforcing fibers results in a lowering of the abrasion resistance of the resultant shaped articles. Accordingly, the conventional shaped aromatic polyamide resin articles blended with the conventional reinforcing fibers exhibit the highest impact strength of 8.5 kgf/cm$^2$.

Accordingly, a strong demand has arisen for a new type of aromatic polyamide resin composition capable of forming shaped articles having an enhanced impact strength and a satisfactory abrasion resistance.

SUMMARY OF THE INVENTION

An object of the present invention is to provide an aromatic polyamide resin composition useful for producing compression-molded articles having a high impact strength and a superior abrasion resistance.

Another object of the present invention is to provide an aromatic polyamide resin composition useful for compression molding at a high efficiency and productivity.

The above-mentioned objects can be attained by the aromatic polyamide resin composition of the present invention, which comprises 3 to 40% by weight of at least one type of polyetheretherketone resin fibers, with the balance consisting of at least one type of aromatic polyamide resin particles.

The aromatic polyamide resin composition of the present invention optionally further comprises 10% by weight or less of polytetrafluoroethylene resin particles.

DESCRIPTION OF THE PREFERRED EMBODIMENTS

The aromatic polyamide resin composition of the present invention comprises 3 to 40% by weight, preferably 8% to 40% by weight of at least one type of polyetheretherketone resin fibers, as reinforcing fibers, with the balance consisting of at least one type of aromatic polyamide resin particles, as a matrix-forming material.

The aromatic polyamide resin usable for the present invention has the recurring units of the general formula:

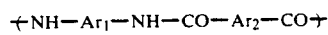

wherein Ar$_1$ and Ar$_2$ respectively represent a divalent aromatic radical, and Ar$_1$ and Ar$_2$ may be the same as or different from each other.

Preferably, the aromatic polyamide resin comprises at least 40 molar % of recurring m-phenyleneisophthalamide units of the formula:

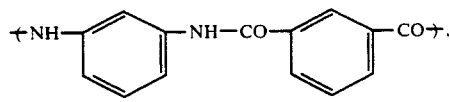

with the balance consisting of at least one type of recurring aromatic amide units other than that of the above-mentioned formula.

The aromatic polyamide homopolymers and copolymers usable for the present invention are poly-condensation products of an aromatic dicarboxylic acid dihalide component consisting of at least one member selected from, for example, isophthalic acid dihalides, terephthalic acid dihalides, methylterephthalic acid dihalides, and naphthalene-2,6-dicarboxylic acid dihalides, with an aromatic diamine component consisting of at least one member selected from, for example, m-phenylene diamine, p-phenylene diamine, 3,4'-diaminodiphenylether, 4,4'-diaminodiphenyl ether, and m-xylylene diamine.

The aromatic polyamide resin usable for the present invention preferably has an intrinsic viscosity ($\eta_{inh}$) of 0.5 to 4.0, more preferably 0.7 to 2.5, determined at a concentration of 0.5 g/100 ml in a solvent consisting of N-methyl-2-pyrrolidone at a temperature of 30° C. The aromatic polyamide resin having the above-mentioned intrinsic viscosity is useful for providing a resinous composition having an enhanced formability, and for producing compression-molded resinous articles having satisfactory physical and mechanical properties. In the aromatic polyamide resin, the polyamide polymer molecules preferably have terminal groups blocked with a monofunctional aromatic compound, for example, aniline or benzoyl chloride. The amount of the aromatic compound-blocked terminal groups is preferably from 20 to 50 molar %, based on the entire amount of the terminal groups of the aromatic polyamide polymer molecules.

The aromatic polyamide resin particles can be produced by an interfacial polymerization method disclosed by Japanese Examined Patent Publication (Kokoku) No. 35-13247 or No. 47-10863, or by a solution polymerization method disclosed by Japanese Examined Patent Publication (Kokoku) No. 35-14399 in which the resultant polyamide resin dissolved in a solvent is deposited in the form of fine particles by using a large amount of a non-solvent.

There is no restriction on the shape and size of the aromatic polyamide resin particles, but preferably, the aromatic polyamide resin particles have an average size of from 10 to 400 μm. When the average size is more than 400 μm, the resultant aromatic polyamide resin composition exhibits a poor compression moldability, and if the average size is less than 10 μm, it is difficult to handle the resultant aromatic polyamide resin composition and to produce shaped articles having an even quality.

The polyetheretherketone resin fibers usable for the present invention comprise a polyetheretherketone (PEEK) resin having recurring units of the formula:

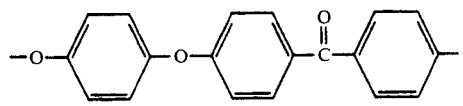

The PEEK fibers are not restricted to those having a specific d tex (denier), a tensile strength, and an ultimate elongation, but preferably, the PEEK fibers are short fibers having a length of 6 mm or less and a d tex of 2 to 15.

If the length is more than 6 mm, a uniform mixing of the PEEK resin fibers with the aromatic polyamide resin particles becomes difficult, and thus the resultant resin composition exhibits an unsatisfactory molding efficiency and the quality of the resultant compression-molded articles is uneven and often fluctuates wildly.

In the resin composition of the present invention the PEEK resin fibers are in an amount of 3 to 40% by weight, preferably 8 to 40%, and the aromatic polyamide resin particles are in a balanced amount, for example, 60% to 97% by weight, preferably 60 to 92% by weight.

If the amount of the PEEK resin fibers is less than 3% by weight, the resultant compression-molded articles have an unsatisfactory impact strength. If the amount of the PEEK resin fibers is more than 40% by weight, it is difficult to uniformly distribute the large amount of the PEEK resin fibers in the resultant resin composition, and thus the resultant resin composition exhibits a poor molding efficiency and the resultant compression-molded articles exhibit a reduced uniformity in quality.

The resin composition of the present invention optionally contains polytetrafluoroethylene (PTFE) resin particles, in addition to the PEEK resin fibers and the aromatic polyamide resin particles.

Preferably, the PTFE resin particles have an average primary particle size of 35 tm or less, more preferably 30 tm or less.

When the PTFE resin particles are added, preferably the amount of the PEEK resin fibers is 3 to 40% by weight, the amount of the PTFE resin particles is 10% by weight or less, more preferably 1% to 8% by weight, and the aromatic polyamide resin particles are in a balanced amount.

The PTFE resin particles effectively enhance the abrasion resistance of the resultant molded articles, but if the content of the PTFE resin particles is more than 10% by weight, the resultant compression-molded articles exhibit a lower mechanical strength, and thus are not practically useful.

The PEEK resin fibers, the aromatic polyamide resin particles, and optionally, the PTFE resin particles are evenly blended by a dry blending method or a wet blending method in which the fibers and the particles are dispersed in a liquid medium in which the fibers and the resin particles do not dissolve.

In the above-mentioned wet blending method, the dispersion liquid medium must be not able to dissolve therein the PEEK resin fibers, the aromatic polyamide resin particles and the PTFE resin particles, not soluble in water, and non-protonic. For example, the dispersion liquid medium may comprise at least one member selected from the group consisting of n-hexane, cyclohexane, and trichlorotrifluoroethane.

When mixed in the dispersion liquid medium, the total content of the PEEK resin fibers, the aromatic polyamide resin particles, and optionally, the PTFE resin particles is preferably from 5% to 50% by weight. The resultant blend in the dispersion can be separated from the liquid medium by a conventional separation method, for example, a filtration or centrifugal-method, or evaporation method for the liquid medium. The separated blend is dried, and then supplied to a compression molding process.

In the compression molding procedure, the dried blend or dry blend is fully initial-degassed at a temperature lower than the second-order transition point of the aromatic polyamide resin, and then compression-molded at a temperature higher than the second-order transition point of the aromatic polyamide resin under a pressure of from 100 to 1000 kg/cm$^2$ for a compression time of 1 to 5 minutes per mm of the thickness of the molded article.

The compression molding procedure can be carried out in the ambient air atmosphere, but preferably is carried out in a reduced pressure atmosphere or an inert gas atmosphere containing nitrogen gas or helium gas, to avoid the undesirable influence of air and moisture on the resultant molded article.

The final shaped article can be directly produced by the compression-molding procedure. Alternatively, the compression-molding product is subjected to a mechanical procedure or cutting procedure to provide a final shaped article, for example, a gear, bearing ball, screw, bolt, nut, piston rod, O-ring or other accurately-processed article.

The compression-molded articles produced from the aromatic polyamide resin composition of the present invention exhibits excellent mechanical properties, for example, impact strength, in addition to a superior heat resistance and flame-retardance. Particularly, the aromatic polyamide resin composition of the present invention can provide compression-molded articles having a significantly higher Izod impact strength than the conventional aromatic polyamide resin articles.

Also, when the PTFE resin particles are added, the resultant compression-molded articles have a high abrasion resistance in addition to the high heat resistance, flame retardance and Izod impact strength, and thus are practically useful.

SPECIFIC EXAMPLES

The present invention will be further explained in the following examples, which are intended to be representative rather than restrictive of the scope of the present invention.

In the examples, the impact strength, compression modulus of elasticity, and abrasion rate were determined by the following test methods.

1. Izod impact strength

The izod impact strength of a specimen was determined in accordance with Japanese Industrial Standard (JIS) K7110, using an Izod impact strength tester made by Uejima Seisakusho.

2. Compression modulus of elasticity

The compression modulus of elasticity of a specimen was determined in accordance with JIS K7208 by using a large scale multipurpose Tensilometer available under the trademark of Tensilon UTM-10T from Orientic Co., and an indicating recorder available under the trademark of Recorder SS-207-EP from Orientic Co.

3. Abrasion rate

The abrasion rate of a specimen was determined in accordance with JIS D4111, using a constant rate abrasion tester available under the trademark of Abrasion Tester HP-S from Tokyo Plant Co.

EXAMPLE 1

A poly(m-phenylene isophthal/terephthal amide) copolymer was prepared in the following manner, in accordance with the interfacial polymerization method.

Namely, 54.1 g of m-phenylene diamine were dissolved in 0.5 l of tetrahydrofuran having a water content of 30 ppm, and the resultant solution was cooled to a temperature of 0° C.

Separately, 60.9 g of isophthalic acid chloride and 40.6 g of terephthalic acid chloride were dissolved in 0.5 l of tetrahydrofuran having a water content of 30 ppm and the resultant mixed acid solution was cooled to a temperature of 0° C. The m-phenylene diamine solution was gradually added in the form of a thin stream to the mixed acid chloride solution while stirring the resultant mixture and maintaining the temperature of the mixture at a level of 0° C., to provide a dispersion of an initial condensation product.

The dispersion of the initial condensation product was rapidly added to a solution of 84.8 g of sodium carbonate in 1 l of water, while stirring the mixture at a high speed, and white particles of an aromatic polyamide copolymer having an intrinsic viscosity of 1.7 were obtained.

The copolymer particles were then washed with water and dried. When the particles were observed by a microscope, it was found that the particles were porous agglomerative particles having an average particle size of 220 μm and consisting of a number of primary particles having an average size of 1.2 μm.

An aromatic polyamide resin composition was prepared by evenly blending 56 g (70% by weight) of the aromatic polyamide copolymer particles and 24 g (30% by weight) of PEEK resin fibers having a length of 1 mm and a d tex of 4.6 in a liquid medium consisting of 1200 g of n-hexane, filtering the dispersion of the blend, and drying the filtered blend.

The resultant resin composition was shaped into a bar shaped article having a length of 127 mm, a width of 14 mm and a thickness of 10 mm by a compression-molding procedure under a compression pressure of 500 kg/cm$^2$ at a temperature of 300° C. in the ambient air atmosphere.

The resultant article had an Izod impact strength of 12.4 kgf/cm$^2$, a compression modulus of elasticity of 6.6×10$^4$ kgf/cm$^2$, and an abrasion rate of 180×10$^{-7}$ cm$^3$/kgf·m determined at a temperature of 180° C.

EXAMPLE 2

The same procedures as those in Example 1 were carried out except that the aromatic polyamide copolymer particles in an amount of 72.0 g (90% by weight) were blended with 8.0 g (10% by weight) of PEEK resin fibers having a length of 3 mm and a d tex of 4.6.

The resultant compression-molded article had a satisfactory impact strength of 11.0 kgf/cm$^2$ and other properties as indicated in Table 1.

COMPARATIVE EXAMPLE 1

The same procedures as in Example 1 were carried out except that the PEEK resin fibers were not employed.

The resultant compression-molded article exhibited a poor impact strength of 2.5 kgf/cm$^2$ and other properties, for example, a satisfactory compression modulus of elasticity of 6.7×10$^4$ kgf/cm$^2$, as shown in Table 1.

EXAMPLE 3

An aromatic polyamide polymer was prepared in a solution polymerization method as described in Japanese Examined Patent Publication (Kokoku) No. 35-14399, in the following manner.

A three-neck flask having a round bottom and equipped with a stirrer, an inlet for introducing nitrogen gas, and a drying tube was charged with 25.96 g of m-phenylene diamine and then with 226 g of distilled dimethyl acetamide, to provide a diamine solution.

The air in the flask was replaced by nitrogen gas. The diamine solution in the flask was cooled by a cooling medium consisting of acetone and dry ice and placed around the flask. Then, 48.8 g of isophthalic acid chloride were rapidly added in one operation to the diamine solution to provide a reaction solution. The dry ice cooling medium was replaced by an ice-water cooling medium, and the reaction mixture was stirred for about 20 to 30 minutes. The reaction solution was heated to a temperature of 60° C., to provide a clear viscous solution. This solution contained about 20% by weight of poly(m-phenylene-isophthalamide) polymer dissolved in dimethylacetamide. The solution was neutralized by gradually adding calcium hydroxide in a molar amount equal to that of hydrochloric acid generated in the solution due to the polymerization reaction, while stirring the solution, and the neutralized solution was diluted by a large amount of dimethyl acetamide to adjust the concentration of the polymer in the solution to 2% by weight.

The resultant diluted solution was admixed into water in an amount equal to that of the solution, in a home-use mixer, while vigorously stirring the resultant admixture, to allow the polymer to deposit in the form of white particles.

The resultant white slurry was filter-pressed, and the separated polymer particles were dispersed in a large amount of water. The dispersing and filter-pressing operation was repeated three to five times to wash the polymer particles with water and to remove calcium chloride contained in the polymer particles.

Finally, the polymer particles were immerse-washed in a mixture of 50 parts by weight of methyl alcohol and 50 parts by weight of acetone, and the washed polymer particles were filter-pressed and then dried to provide fine white polymer particles.

The resultant solution-polymerized poly(m-phenylene isophthal amide) polymer (PMIA) had an intrinsic viscosity of more than 1.8 determined at a concentration of 0.5 g/100 ml in N-methyl-2-pyrrolidone at 30° C.

Also, the resultant polymer particles were agglomerative particles having an average size of 250 μm, an apparent density of 0.19 g/ml and a surface area of 52 m²/g and consisting of a number of primary polymer particles having an average size of 250 μm.

Separately, a PEEK resin filaments yarn having a yarn count of 222 d tex (200 denier)/48 filaments was cut to a length of 3 mm. The cut PEEK resin fibers in an amount of 16 g were placed together with 1200 g of n-hexane in a table mixer and the resultant mixture was stirred at a speed of 2100 rpm for 60 minutes to provide a suspension. To the suspension was added 60.8 g of the solution-polymerized PMIA resin particles and 3.2 g of PTFE resin particles (available under a trademark of Tefron 7J, from Du Pont), and the resultant admixture was stirred for 60 minutes. The admixture was filter-pressed and the separated resin composition was dried at a temperature of 70° C. under vacuum. The resultant resin composition comprised 76% by weight of the PMIA resin particles, 20% by weight of the PEEK resin fibers and 4% by weight of the PTFE resin particles.

The resin composition was dried under the ambient air pressure and compress-molded to provide an article, and the article was subjected to a mechanical process to provide specimens.

The specimens exhibited a very high impact strength of 20.5 kgf/cm², a satisfactory compression modulus of elasticity of 5.5 kgf/cm², and a significantly reduced abrasion rate of $2 \times 10^7$ cm³/kgf;cm at a temperature of 150° C.

COMPARATIVE EXAMPLE 2

The same procedures as in Example 3 were carried out except that 60.8 g of the solution-polymerized PMIA resin particles were blended with 3.2 g of the PTFE resin particles in a n-hexane by using a table mixer. The resultant slurry was filter-pressed and the separated mixed resin particles were dried to provide a resin composition free from the PEEK resin fibers.

The resultant compression-molded article exhibited a poor impact strength of 2.0 kgf/cm², although having a satisfactorily small abrasion rate of $2 \times 10^{-7}$ cm³/kgf;cm at 150° C.

EXAMPLE 4

A m-phenylene isophthalamid polymer was prepared in accordance with the interfacial polymerization method as disclosed in Japanese Examined Patent Publication (Kokoku) No. 47-10863 in the following manner.

Namely, 173 g of m-phenylene diamine were dissolved in 1 tetrahydrofuran having a water content of 35 ppm, and the resultant solution was cooled to a temperature of 0° C.

Separately, 325 g of isophthalic acid chloride were dissolved in 1 of tetrahydrofuran having a water content of 35 ppm, and the resultant solution was cooled to a temperature of −15° C.

While the acid chloride solution was maintained at a temperature of −15° C. and stirred, the diamine solution was gradually added to the acid chloride solution to provide a dispersion of an initial condensation product.

The dispersion of the initial condensation product was rapidly added to a solution of 200 g of calcium carbonate in 2 l of water, while stirring the dispersion at a high speed, and white polymer particles having an intrinsic viscosity of 1.6 determined by the above-mentioned method were obtained.

The resultant polymer particles were recovered from the polymerization system, washed with water and dried. When the resultant polymer particles were observed by a microscope, it was found that the polymer particles were in the form of porous agglomerative particles having an average size of 155 μm, an apparent density of 0.33 g/ml and a surface area of 5.0 m²/g, and consisting of a number of primary polymer particles having an average size of 1.0 μm.

Separately, a dispersion of the same PEEK resin fibers as mentioned in Example 3, in an amount of 24 g (30% by weight), in 1200 g of n-hexane was stirred at a speed of 2000 rpm for 60 minutes in a table mixer.

Then, 56 g (70% by weight) of the PMIA resin particles were added to the PEEK resin fiber dispersion, and the resultant admixture was stirred for 60 minutes. The admixture was then filter-pressed and dried at a temperature of 70° C., under vacuum, to provide an aromatic polyamide resin composition.

The resin composition was dried at a temperature of 150° C. under the ambient air pressure for 4 hours or more, and the resultant dried composition in an amount of 65.3 g was fed into a mold and compression-molded at 35 a mold temperature of 300° C. under a compression pressure of 500 kgf/cm² for 30 minutes. A compression-molded plate having a length of 127 mm, a width of 25.4 mm and a thickness of 15 mm was obtained.

A plurality of specimens were provided from the plate by a cutting procedure.

The specimens exhibited a very high impact strength of 21.6 kgf/cm² and a satisfactory compression modulus of elasticity of $6.1 \times 10^4$ kgf/cm².

For compression, the same procedures as mentioned above were carried out except that the PEEK resin fibers were replaced by conventional reinforcing carbon fibers having a length of 3 mm and a d tex of 2.2.

The resultant compression-molded article exhibited a poor impact strength of 5 to 8.5 kgf/cm², although having a satisfactory compression modulus of elasticity of $6.8 \times 10^4$ kgf/cm².

EXAMPLE 5

A poly(m-phenylene isophthalamide) (PMIA) resin was prepared in accordance with the interfacial polymerization method disclosed in Japanese Examined Patent Publication (Kokoku) No. 47-10863, in the following manner.

Namely, 173 g of m-phenylene diamine were dissolved in 1 l of tetrahydrofuran having a water content of 20 ppm and the resultant diamine solution was cooled to a temperature of 0° C.

Separately, 325 g of isophthalic acid chloride were dissolved in 1 l of tetrahydrofuran having a water content of 20 ppm and the resultant acid chloride solution was cooled to a temperature of 0° C.

The acid chloride solution was gradually added in the form of a thin stream into the diamine solution and then a solution of 0.15 g of aniline in 10 ml of tetrahydrofuran was added to the resultant mixture while stirring and maintaining the temperature of the mixture at 0° C., to provide a dispersion of an initial condensation product.

The dispersion of the initial condensation product was rapidly added to a solution of 200 g of sodium carbonate in 2 l of water, while stirring the mixture at a high speed, to produce white poly(m-phenylene isophthalamide) resin particles having an intrinsic viscosity of 1.4 determined by the above-mentioned method.

A blend of 57 g of the poly(m-phenylene isophthalamide) resin particles with 15 g of the same PEEK resin fibers as in Example 3 and 3 g of PTFE resin particles was prepared in a table mixer by stirring at a speed of 2000 rpm for 60 minutes. The resultant resin composition consisted of 78.4% by weight of PMIA resin particles, 20% by weight of PEEK resin fibers and 1.6% by weight of PTFE resin particles.

The composition was subjected to the same compression-molding procedure as in Example 3. The resultant article exhibited a very high impact strength of 22.5 kgf/cm$^2$, a satisfactory compression modulus of elasticity of 6.0 kgf/cm$^2$, and a satisfactory abrasion rate of $8 \times 10^{-7}$ cm$^3$/kgf·m at 150° C.

TABLE 1

| Item | Example No. | Example 1 | Example 2 | Example 3 | Example 4 | Example 5 | Comparative Example 1 | Comparative Example 2 |
|---|---|---|---|---|---|---|---|---|
| Aromatic polyamide resin particle | Type Interfacial polymerized PMIA resin (*)$_1$ | — | — | — | yes | yes | yes | — |
| | Solution polymerized PMIA resin (*)$_1$ | — | — | yes | — | — | — | yes |
| | Interfacial polymerized PMITA copolymer (*)$_2$ | yes | yes | — | — | — | — | — |
| | Content (% by weight) | 70 | 90 | 76 | 70 | 78.4 | 100 | 95 |
| PEEK fiber | Fiber length (mm) | 1 | 3 | 3 | 3 | 3 | — | — |
| | Content (% by weight) | 30 | 10 | 20 | 30 | 20 | — | — |
| PTFE particle | Content (% by weight) | — | — | 4 | — | 1.6 | — | 5 |
| Compression molded article | Izod impact strength (kgf/cm$^2$) | 12.4 | 11.0 | 20.5 | 21.6 | 22.5 | 2.5 | 2.0 |
| | Compression modulus of elasticity ($\times 10^4$ kgf/cm$^2$) | 6.6 | 7.0 | 5.5 | 6.1 | 6.0 | 6.7 | 7.4 |
| | Abrasion rate at 150° C. ($\times 10^{-7}$ cm$^3$/kgf · m) | 180 | 120 | 2 | 280 | 8 | 80 | 10 |

Note:
(*)$_1$ Poly(m-phenylene isophthalamide) homopolymer
(*)$_2$ Poly(m-phenylene isophthal/terephthal amide) copolymer Examples 1 to 5 clearly illustrate that the aromatic polyamide resin composition of the present invention containing PEEK resin fibers as a reinforcing material is useful for producing a compression-molded resin article having excellent mechanical properties, especially a significantly higher impact strength than that of conventional aromatic polyamide resin articles, in addition to a superior heat resistance and flame retardance similar to those of the conventional article.

Also, the aromatic polyamide resin composition of the present invention containing PTFE resin particles in addition to the PEEK resin fibers is useful for producing compression-molded resin article having an excellent abrasion resistance in addition to the superior impact strength, heat resistance, and flame-retardance thereof.

I claim:

1. An aromatic polyamide resin composition for compression molding, comprising 3 to 40% by weight of at least one type of polyetheretherketone resin fibers having a length of 1 to 6 mm; 1% to 10% by weight of polytetrafluoroethylene resin particles; and the balance consisting of at least one type of aromatic polyamide resin particles.

2. The resinous composition as claimed in claim 1, wherein said aromatic polyamide resin comprises at least 40 molar % of recurring m-phenyleneisophthalamide units and the balance consisting of at least one type of recurring aromatic amide units other than the above-mentioned units.

3. The resinous composition as claimed in claim 1, wherein the polyetheretherketone resin has the recurring units of the formula:

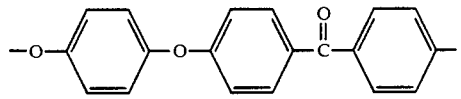

* * * * *